Oct. 25, 1932.   S. WARREN   1,884,430

TOY COASTER

Filed March 7, 1930

Samuel Warren
INVENTOR.

BY [signature]

ATTORNEYS.

Patented Oct. 25, 1932

1,884,430

UNITED STATES PATENT OFFICE

SAMUEL WARREN, OF NEW YORK, N. Y.

TOY COASTER

Application filed March 7, 1930. Serial No. 433,849.

This invention relates to a toy for children in the form of an inclined runway upon which a cart large enough to support a child may be properly guided so that the whole acts as a roller coaster.

The object of the invention is to produce a substantial toy of the kind referred to which is safe for small children and which can be easily taken apart for shipping or storage and may also be readily and rigidly assembled without the use of any tools and in most cases by a child.

A feature of the invention consists in a sectional runway, the top section of which is provided with a horizontal portion extending for a short distance and about equal to the length of the cart to be used on it. Extending below and parallel to this horizontal portion is a platform on either side of the runway, thus making it easy for a child to start the cart safely and easily down the incline by resting his feet on the platforms and giving the cart a push to start it down the incline. Other features relate to the sectional arrangement and the apportioning of the parts so that the runway may be taken apart and stored in a comparatively small space.

Figure 1:
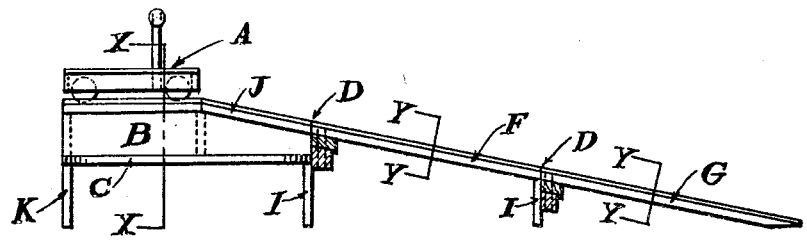
Figure 2:
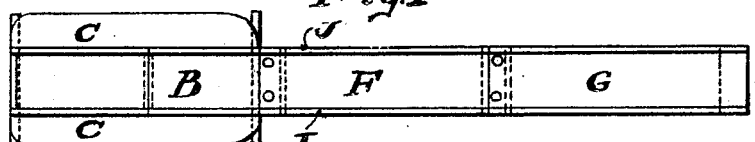
Figure 3:
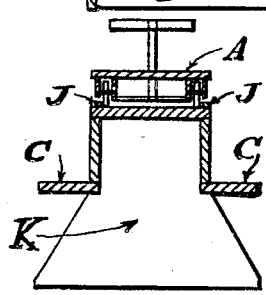
Figures 4, 5:
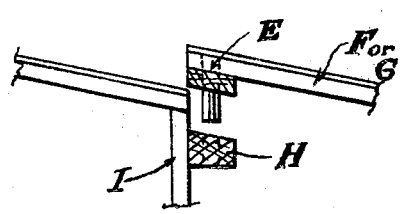
Figure 6:
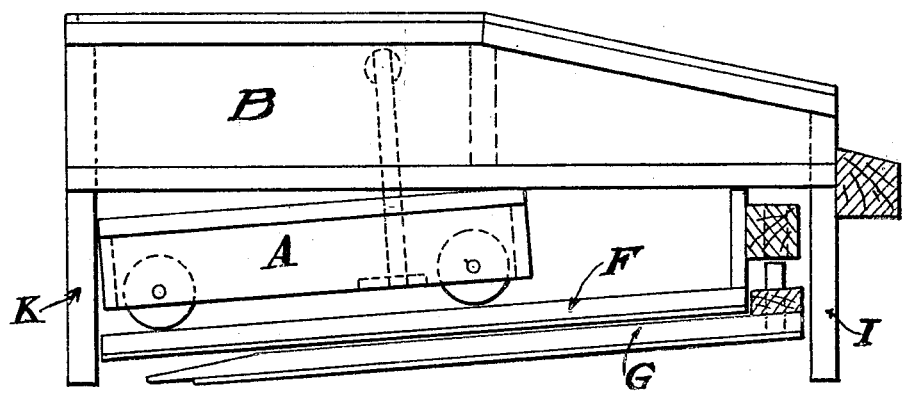

The details of the construction will be better understood by reference to the accompanying drawing, in which Figure 1 is a side elevation;

Figure 2 is a plan view;

Figure 3 a section on the line x—x of Figure 1;

Figure 4 a section on the line y—y of Figure 1;

Figure 5 is an enlarged side elevation showing one section somewhat separated from another to better illustrate the joining of the two sections; and Figure 6 is a view of the sections packed for storage or shipping.

Referring to the drawing, the cart is shown at A having an upright portion forming a handle, as is usual in devices of this sort, the cart itself forming per se no part of the invention.

The runway forming the subject matter of my invention consists of a top section B, an intermediate section F and a bottom section G. The top section has side portions suitably secured to base members I and K. As shown in Figure 3 these consist of a solid piece but they may, of course, be formed as legs. The top section B has a horizontal portion substantially the length of the cart and also an inclined portion leading from it. Strips J are provided along the side of the top to hold the cart on the runway. Extending parallel to the horizontal portion of the runway and for the entire length of the top section are platforms C, one on each side of the runway. These act as a foot rest for the child both in mounting the cart and in starting it down the incline. From Figure 3 it will be noted that the width of the supports I and K is about equal to the entire distance between the outer edges of the platforms C to give the whole section the proper stability when pressure is exerted on the platforms. The sections are separated at the joint D, and one section is attached to another by means of a suitable block H, Figure 5, bored to receive pins E secured to the next section shown at F, Figure 1. The upper portion of this second section is supported solely by the block H while its other end rests upon the floor or ground through the medium of a support I which may be similar to that shown in the main or top section. The last section G is similarly attached to the second section and its lower end is supported on the floor or on the ground.

When it is desired to store the runway or to pack it for shipment, the sections are pulled apart and stored as shown in Figure 6. The sections F and G are slightly shorter than the distance between the supports I and K so that they may be fitted in between them; the top section is of such height as to also provide room for the cart.

Having thus described my invention what I desire to claim and secure by Letters Patent is:

1. A toy coaster including a runway having a horizontal portion near its highest point and an incline leading therefrom to the floor level, and a platform on each side of the runway adjacent the horizontal portion thereof.

2. A toy coaster including in combination, a runway having a portion near its top extending horizontally for a distance approximately equal to the length of the car to be used on the runway and an inclined track running from the horizontal portion to the floor level.

3. A toy coaster including in combination, a runway having a horizontal portion near its top and an incline running therefrom to the floor level, a platform on either side of the runway adjacent the horizontal portion thereof and supports for the runway near the upper end of a width substantially equal to the distance between the outer edges of the platforms.

4. A toy coaster formed in sections, the highest section having a horizontal portion and an inclined portion, spaced supports for said section, and a second section adapted to be joined to the inclined portion of the first section and of a length slightly less than the distance between the supports of said first section.

5. A toy coaster, in combination, a sectional runway, the top section of which is provided with a horizontal portion and an inclined portion, a second section joined to the first section and supported at one end thereof, the other end adapted to be supported from the floor, and a third section joined to the second section and supported thereby at one end.

6. A toy coaster formed in sections, the highest section having a horizontal portion and an inclined portion, spaced supports for said section, a second section adapted to be joined to the inclined portion of the first section and supported at one end thereof, a third section adapted to be joined to the second section, the lengths of the second and third sections being slightly less than the distance between the supports of the first section.

7. A toy coaster formed in sections, the highest section having a horizontal portion and an inclined portion, spaced supports for said section, the horizontal portion having a length substantially equal to that of the cart to be used on the coaster, a platform extending on either side of the runway and parallel to the horizontal portion thereof and extending the entire length of the section.

8. A toy coaster formed in sections, the highest section having a horizontal portion and an inclined portion, spaced supports for said section, the horizontal portion having a length substantially equal to that of the cart to be used on the coaster, a platform extending on either side of the runway and parallel to the horizontal portion thereof and extending the entire length of the section, the width of said supports being substantially equal to the distance between the outer edges of the platforms.

Signed at New York, N. Y., this sixth day of March, 1930.

SAMUEL WARREN.